United States Patent
Niu et al.

(10) Patent No.: US 9,112,758 B2
(45) Date of Patent: Aug. 18, 2015

(54) REMOTE RADIO UNIT (RRU) AND BASE BAND UNIT (BBU)

(75) Inventors: Huaning Niu, Milpitas, CA (US); Hujun Yin, Saratoga, CA (US); Geng Wu, Plano, TX (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/997,226

(22) PCT Filed: Oct. 1, 2011

(86) PCT No.: PCT/US2011/054481
§ 371 (c)(1),
(2), (4) Date: Apr. 21, 2014

(87) PCT Pub. No.: WO2013/048526
PCT Pub. Date: Apr. 4, 2013

(65) Prior Publication Data
US 2014/0226736 A1    Aug. 14, 2014

(51) Int. Cl.
*H04L 27/00* (2006.01)
*H04L 27/26* (2006.01)
*H04L 5/00* (2006.01)

(52) U.S. Cl.
CPC ........ *H04L 27/2628* (2013.01); *H04L 27/2607* (2013.01); *H04L 5/0035* (2013.01); *H04L 5/0048* (2013.01)

(58) Field of Classification Search
USPC ........................... 375/259, 260, 295, 285, 296
See application file for complete search history.

(56) References Cited

U.S. PATENT DOCUMENTS

| | | | | |
|---|---|---|---|---|
| 5,852,630 A | * | 12/1998 | Langberg et al. | 375/219 |
| 2010/0290413 A1 | * | 11/2010 | Kuwahara | 370/329 |
| 2010/0317292 A1 | | 12/2010 | Takatani et al. | |
| 2011/0013714 A1 | * | 1/2011 | Tamaki et al. | 375/285 |
| 2011/0096869 A1 | * | 4/2011 | Nakayama | 375/295 |

FOREIGN PATENT DOCUMENTS

WO    2013/048526 A1    4/2013

OTHER PUBLICATIONS

International Preliminary Report on Patentability and Written Opinion received for PCT Patent Application No. PCT/US2011/054481, mailed on Apr. 10, 2014, 6 pages.
CPRI Specification, "Common Public Radio Interface (CPRI); Interface Specification", V 4.2, Sep. 29, 2010, 113 pages.
International Search Report and Written Opinion received for PCT application No. PCT/US2011/054481, mailed on May 30, 2012, 9 pages.

* cited by examiner

*Primary Examiner* — Siu Lee
(74) *Attorney, Agent, or Firm* — Thorpe North & Western LLP

(57) ABSTRACT

A remote radio unit (RRU) in a radio base station system can include a cyclic prefix (CP) module having a CP adder for downlink channel processing includes a CP remover for uplink channel processing. The RRU can be configured to communicate with a base band unit (BBU) via a physical communication link and communicate with a wireless mobile device via an air interface. The BBU can be configured for media access control (MAC) layer processing.

21 Claims, 11 Drawing Sheets

REMOTE RADIO UNIT (RRU) AND BASE BAND UNIT (BBU)

BACKGROUND

Wireless mobile communication technology uses various standards and protocols to transmit data between a base transceiver station (BTS) and a wireless mobile device. Some wireless devices communicate using an orthogonal frequency-division multiplexing (OFDM) digital modulation scheme via a physical layer. OFDM standards and protocols can include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi. In 3GPP radio access networks (RANs) in LTE systems, the BTS can be a combination of evolved Node Bs (also commonly denoted as enhanced Node Bs, eNodeBs, or eNBs) and Radio Network Controllers (RNCs) in a Universal Terrestrial Radio Access Network (UTRAN), which communicates with the wireless mobile device, known as a user equipment (UE). A downlink (DL) transmission can be a communication from the BTS (or eNodeB) to the wireless mobile device (or UE), and an uplink (UL) transmission can be a communication from the wireless mobile device to the BTS.

In a centralized, cooperative, or cloud radio access network (C-RAN), the base transceiver station (or eNodeB) functionality can be subdivided between a base band unit (BBU) processing pool and a remote radio unit (RRU) or a remote radio head (RRH) with optical fiber connecting the BBU to the RRU. A common public radio interface (CPRI) can be used to define an interface between the BBU and the RRU.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1A:
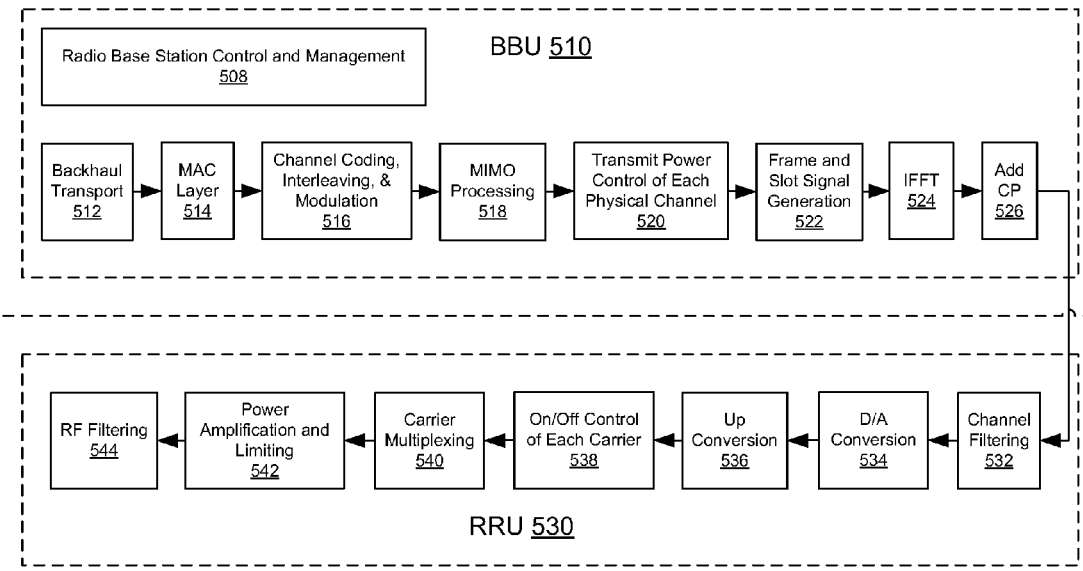
FIG. 1A illustrates a block diagram of a base band unit (BBU) and a remote radio unit (RRU) of a centralized radio access network (C-RAN) for a downlink (DL) transmission in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence. As used herein, the terms a RRU and a RRH are considered to be interchangeable. As used herein, the terms BTS and eNodeB are considered to be interchangeable, where the eNodeB is the BTS in the LTE RAN.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In a C-RAN, the functionality of the BTS (or eNodeB) can be split between a BBU 510 and an RRU 530 (or RRH), as illustrated in FIG. 1A. For example, the BBU can provide the radio functions of the digital baseband domain, and the RRU can provide the analog radio frequency functions. The BBU and the RRU can communicate with each other via a physical transport network, such as an optical transport network. The physical transport network between the RRUs and BBUs can act as a bottleneck on a C-RAN with heavy mobile internet traffic. The fiber of the physical transport network between the RRUs and BBUs may carry a large amount of baseband sampling data in real time. A C-RAN re-architecture can be used to reduce the data rate by reducing the digital processing at the BBU, which can reduce the baseband sampling data transmitted over the physical transport network. In the C-RAN re-architecture, part of the baseband processing can be moved to the RRU to reduce the amount of data transmitted over the physical transport network. For example, a cyclic prefix (CP) can be moved from the BBU to the RRU, thus reducing the data rate in the physical transport network. Several examples are provided showing different C-RAN architectures that can be used to reduce the amount of data transmitted between an RRU and a BBU.

A wireless communication system can be subdivided into various sections referred to as layers. In the LTE system, communication layers can include the physical (PHY), media access control (MAC), radio link control (RLC), packet data convergence protocol (PDCP), and radio resource control (RRC) layers. The physical layer can include the basic hardware transmission components of a wireless communication system, as illustrated in FIG. 1A for a downlink channel processing and 1B for an uplink channel processing.

In downlink channel processing, a base transceiver station (BTS) can include media access control (MAC) and physical (PHY) layer processing elements, such as a MAC layer processor, a channel coder, a channel interleaver, a channel modulator, a multiple-input multiple-output (MIMO) processor, a transmit power controller, a frame and slot signal generator, an inverse fast Fourier transform (IFFT) modulator, a cyclic prefix (CP) adder, a channel filter, a digital-to-analog converter (DAC), an up converter, a gain controller, a carrier multiplexer, a power amplifier and limiter a radio frequency (RF) filter, and one or more transmit antennas. The terms "BTS" and "eNodeB" are used interchangeably throughout.

The functionality of the BTS (or eNodeB) can be split between a BBU 510 and RRU 530 (or RRH), as illustrated in FIG. 1A. For example, the BBU can provide the radio functions of the digital baseband domain, and the RRU can provide the analog radio frequency functions. In the common public radio interface (CPRI) standard, the BBU can provide similar functionality to a radio element controller (REC) and the RRU can provide similar functionality to a radio element (RE). The BBU can provide radio base station control and management 508. In another example, the BBU can include backhaul transport 512 processing; MAC layer 514 processing; channel coding, interleaving, and modulation 516; MIMO processing 518; transmit power control of each physical channel 520; frame and slot signal generation 522; IFFT 524 modulation; and adding CP 526. The RRU can include channel filtering 532, digital-to-analog (D/A) conversion 534, up conversion 536, on/off control of each carrier 538, carrier multiplexing 540, power amplification and limiting 542, and RF filtering 544.

Figure 1B:
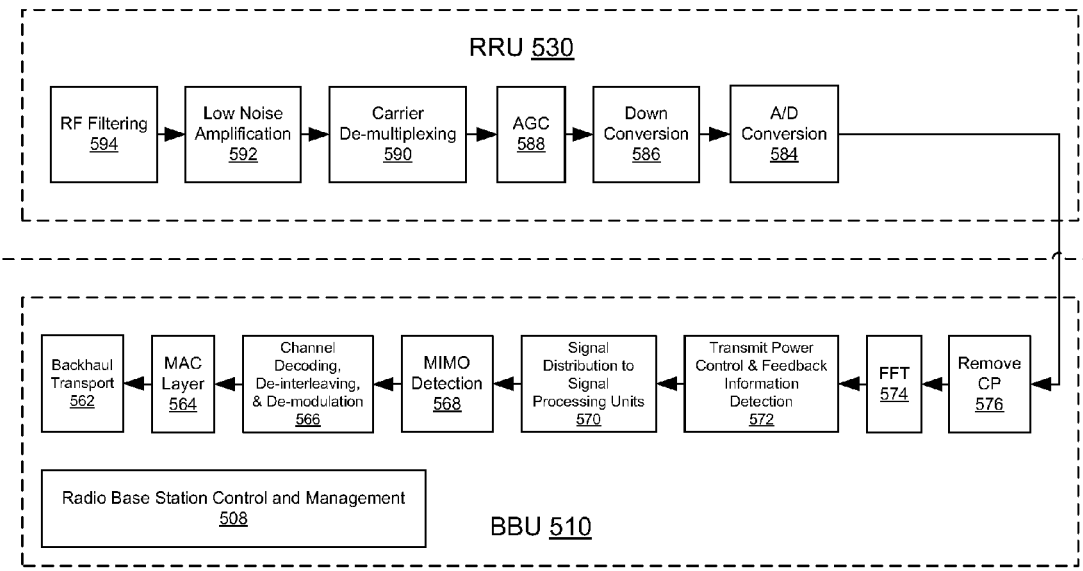
FIG. 1B illustrates a block diagram of a base band unit (BBU) and a remote radio unit (RRU) of a centralized radio access network (C-RAN) for an uplink (UL) transmission in accordance with an example.

In uplink channel processing, the BTS can include MAC and PHY layer processing elements, such as one or more receive antennas, an RF filter, a low noise amplifier, a carrier de-multiplexer, an automatic gain controller, a down converter, an analog-to-digital converter (ADC), a CP remover, a fast Fourier transform (FFT) demodulator, a transmit power control and feedback information detector, a signal distribution and signal processor, a MIMO detector, a channel de-modulator, a channel de-interleaver, a channel decoder, and a MAC layer processor. The functionality of the BTS (or eNodeB) can be split between a BBU 510 and an RRU 530 (or RRH), as illustrated in FIG. 1B. For example, the RRU can include RF filtering 594, low noise amplification 592, carrier de-multiplexing 590, automatic gain control (AGC) 588, down conversion 586, digital-to-analog (D/A) conversion 584, and channel filtering 582. The BBU can include CP removal 576; FFT 574 demodulation; transmit power control and feedback information detection 572; signal distribution to signal processing units 570; MIMO detection 568; channel decoding, de-interleaving, and de-modulation 566; MAC layer 564 processing; and backhaul transport 562 processing.

Figure 2A:
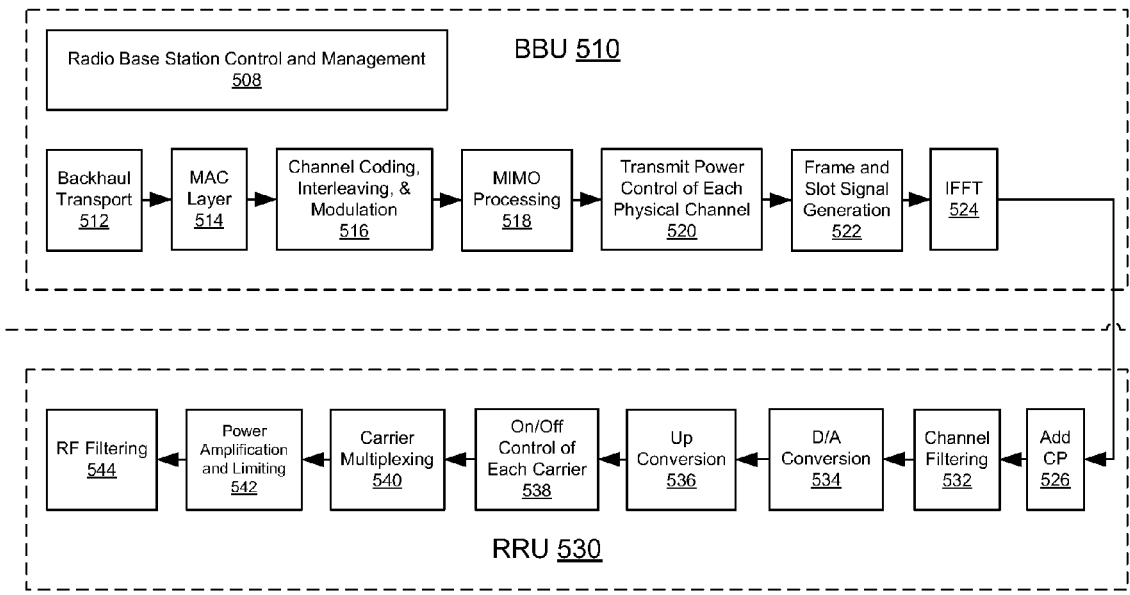
FIG. 2A illustrates a block diagram of a base band unit (BBU) and a remote radio unit (RRU) of a centralized radio access network (C-RAN) with an add cyclic prefix (CP) module in the RRU for a downlink (DL) transmission is accordance with an example.
Figure 2B:
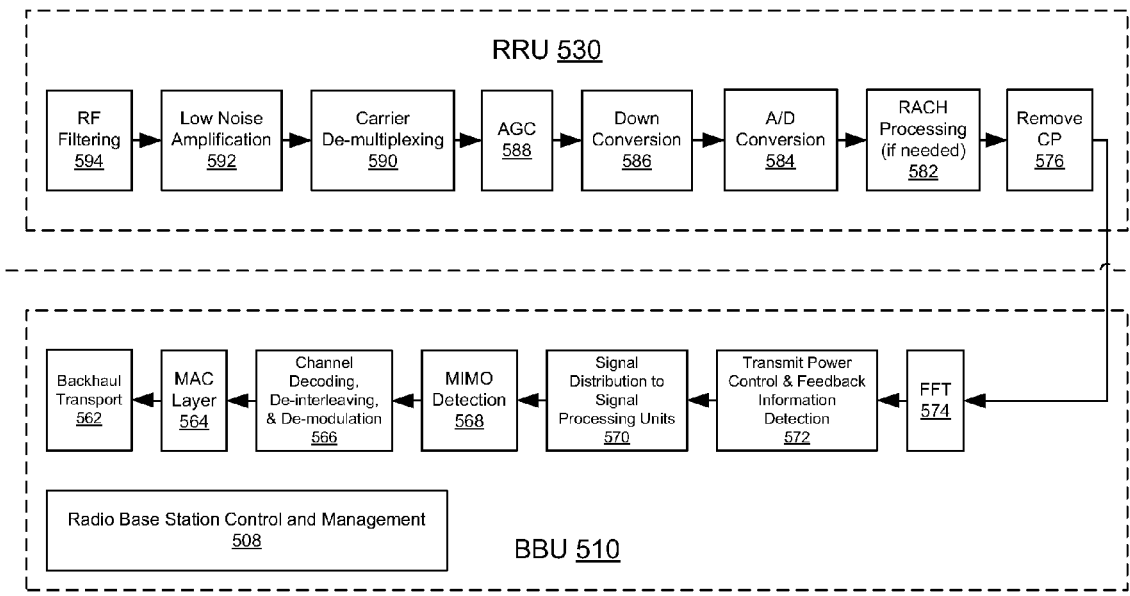
FIG. 2B illustrates a block diagram of a base band unit (BBU) and a remote radio unit (RRU) of a centralized radio access network (C-RAN) with a remove cyclic prefix (CP) module in the RRU for an uplink (UL) transmission in accordance with an example.

One way of reducing the amount of data transported between an RRU and a BBU is by moving the location where a CP module functions from the BBU to the RRU. FIGS. 2A and 2B provide examples for downlink channel processing and uplink channel processing, respectively.

In a downlink channel processing example, a CP module including the CP adder 526 can be located in the RRU 530, as illustrated in FIG. 2A. The RRU can be configured to communicate with the BBU 510 via a physical communication link, such as a fiber optic cable in an optical transport network, using a general interface (or shared interface) between the RRU and BBU, such as the CPRI. The RRU can be configured to communicate with a wireless mobile device via an air interface using a wireless standard, such as 3GPP LTE or WiMAX. The BBU can be configured for MAC layer processing, transport layer processing, and/or logical layer processing. The general interface (e.g., CPRI) can provide an interface between the CP adder in the CP module in the RRU and an inverse fast Fourier transform (IFFT) modulator 524 in a modulating module in the BBU.

In an uplink channel processing example, the CP module including the CP remover 576 can be located in the RRU 530, as illustrated in FIG. 2B. The general interface (e.g., CPRI) can provide an interface between an output of the CP remover in the CP module in the RRU and an input of the fast Fourier transform (FFT) demodulator 574 in the modulating module in the BBU 510.

The RRU and BBU of a RAN can be included in a centralized, cooperative, or cloud radio access network (C-RAN). The purpose and components of a C-RAN are briefly reviewed. Additional examples for C-RAN re-architecture are provided following the CRAN review.

The proliferation of the mobile broadband internet has increased the mobile internet traffic and the load on the BTS and the core network in the RAN. A typical RAN architecture can include a BTS which connects to a fixed number of sector antennas that can cover a small area and that can handle transmission/reception signals in the sector coverage area. In addition, the typical RAN can be limited by interference, so improving spectrum capacity can be limited.

C-RAN can provide centralized processing, co-operative radio, and real-time cloud infrastructure RAN. Centralized signal processing can greatly reduce the number of site equipment rooms needed to cover the same area as a traditional RAN. Co-operative radio with distributed antenna equipped by a remote radio unit (RRU) can provide higher spectrum efficiency than the traditional RAN. A real-time cloud infrastructure based on an open platform and BTS virtualization can enable processing power aggregation and dynamic allocation, which can reduce the power consumption and increase infrastructure utilization rate. C-RAN can provide reduced cost and lower energy consumption, higher spectral efficiency, support multiple standards and smooth evolution, and better internet services to end users.

A typical characteristic of a mobile network is that mobile devices frequently move from one place to another. The movement of mobile devices can have a time-geometry trend. During work hours, a large number of mobile devices move from residential areas to central office areas and industrial areas for work. During evening hours or non-work hours, mobile devices move back to the residential areas (e.g., homes) or entertainment areas. Thus, the network load moves in the mobile network with a similar pattern.

More specifically, each BTS's processing capability may be used by the active mobile devices within the BTS's cell range. When mobile devices move outside the BTS's cell range, the BTS can remain idle with a large portion of the BTS's processing power wasted. In a macro view of the mobile network, the BTSs in residential areas or entertainment areas may be largely idle during work hours, and the BTSs in central office areas and industrial areas may be largely idle during non-work hours. The C-RAN architecture can allow BTS processing to be utilized in both the residential and/or entertainment areas and the central office and/or industrial areas during both work hours and non-work hours, thus balancing the network load and reducing the idle time of BTS processors and increasing the coverage area of the BTS.

Figure 3:
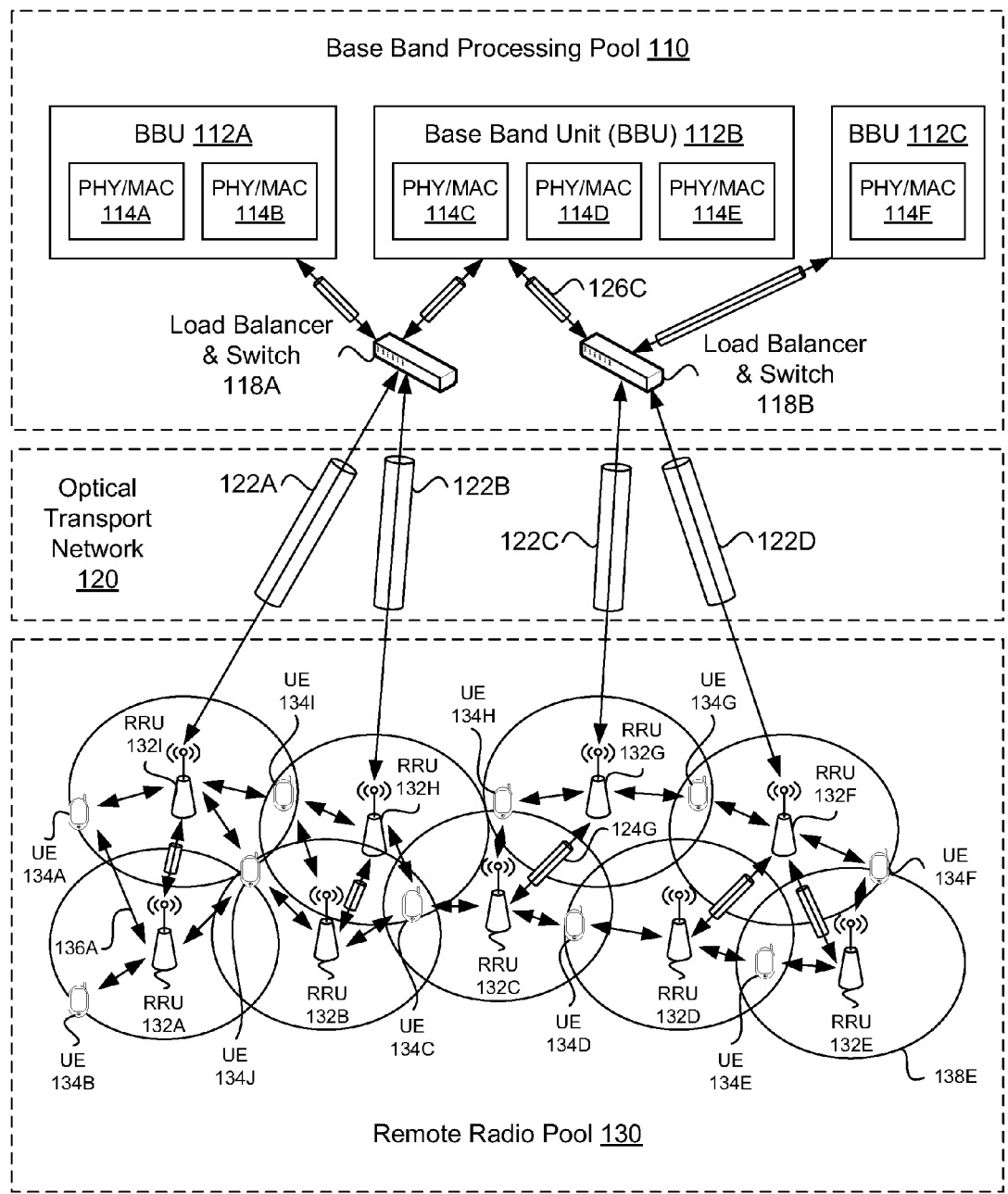
FIG. 3 illustrates a block diagram of a base band unit (BBU) and a remote radio unit (RRU) configuration of a centralized radio access network (C-RAN) in accordance with as example.

As illustrated in FIG. 3, the C-RAN can be composed of three parts: a remote radio pool 130 equipped by remote radio units (RRUs) 133A-I with antennas, a base band processing pool 110 including base-band units (BBUs) 112A-C, and a fiber or cable 122A-D and 124G in a physical transport network 120 connecting at least one of the RRUs in the remote radio pool to at least one of the BBUs in the base band pool. The base band processing pool can be centralized. Each BBU can include a high-performance general purpose processor, a real-time virtualization processor, and/or a physical (PHY) layer processor and/or a MAC layer processor 114A-F. The BBUs can be coupled to a load balancer and switch 118A-B via electrical or optical cabling 126C. The physical transport network can be a low-latency transport network, a bandwidth-efficient network, and/or an optical transport network 120 using optical fiber or optical cabling. In another example, the physical transport network can be a high speed electrical transport network. The physical transport network can provide a physical communication link between the BBU and the RRU. The physical communication link can include an optical fiber link or a wired electrical link. The physical communication link can use the CPRI. In the CPRI standard, the BBU can be referred to as a radio element controller (REC). The RRU can be referred to as a remote radio head (RRH), a remote radio equipment (RRE), or a radio equipment (RE). Each RRU can be separated from the BBU by a selected distance. For example, each RRU may be separated from a BBU by at least 50 meters. However, the actual design and layout can depend on system specifications. The actual distance of each RRU may be greater than or less than 50 meters. Each RRU can include a sector, cell, or coverage area 138E for a mobile device, such as a user equipment (UE) 134A-J, where the mobile device may be located within multiple sectors, cells, or coverage areas. The distributed RRUs of the C-RAN can provide a RAN with high capacity and a wide coverage area.

RRUs 132A-I can be smaller, easier to install, easier to maintain, and consume less power than the BBUs 112A-C. The base band processing pool 110 can aggregate the processing power of the BBU through real-time virtualization technology and provide the signal processing capacity to the virtual BTSs or RRUs in the pool. The physical transport network can distribute the processed signals to the RRUs in the remote radio pool 130. The centralized BBU pool can reduce the number of BTS rooms used for BBUs and can make resource aggregation and large-scale cooperative radio transmission/reception possible. A BTS room can be an equipment room used to house BBUs of the BBU pool and other BTS processing equipment.

A physical communication link can use the CPRI. A radio element controller (REC) can contain the radio functions of the digital baseband domain, and a radio element (RE) can contain the analog radio frequency functions. The functional split between both parts can be performed so that a generic interface based on In-Phase and Quadrature-Phase (IQ or I/Q) data can be defined. CPRI can be used to transmit IQ samples between the REC (or BBU) and the RE (or RRU). For WiMAX, the REC can provide access to network entities (e.g. other BSs or access services network gateway (ASN-GW)), and the RE can serve as the air interface to a subscriber station (SS) and/or a mobile subscriber station (MSS). For evolved universal terrestrial radio access (E-UTRA) network, UTRAN, or evolved UTRAN (eUTRAN) used in 3GPP LTE, the REC can provide access to the evolved packet core (EPC) for the transport of user plane and control plane traffic via an S1 interface, and the RE can serve as the air interface to the UE.

The physical transport network 120 can act as a bottleneck on a C-RAN with heavy mobile internet traffic. The fiber of the physical transport network between the RRUs and BBUs may carry a large amount of baseband sampling data in real time. For example, in a 20 megahertz (MHz) frequency-division duplexing (FDD) four antennas deployment, with 16 bit per I/Q sample respectively and 8B/10B line coding, the rate on a fiber (or fiber link rate) is $4 \times 16 \times 2 \times 10/8 \times 30.72M = 4.915$ Gigabits per sample (Gbps) (4 antennas$\times$16 bit per I/Q sample$\times$2 bits per I/Q data$\times$10/8 bits for line coding$\times$30.72 megabits (Mb) per sample for an LTE sampling rate). The fiber link rate (also referred to as the CPRI rate when CPRI is used) can be the data rate on a fiber or cable of the physical transport network. Support of more advanced feature such as carrier aggregation or more antennas (e.g., eight antennas) can dramatically increase the data rate on the physical transport network. The high data rates between the REC and the RE to carry the baseband sampling data in real time can reduce the cost effectiveness of the CRAN architecture.

Three different approaches can be used to handle the high data rate of the physical transport network. In a first approach, data compression techniques such as reducing number of bits/sample or non-linear quantization can be used, which can reduce performance (using simple quantization) or increase complexity. Second, the fiber network can be upgraded to provide wavelength division multiplexing (WDM), which can increase the cost of the physical transport network and the C-RAN. Third, a C-RAN re-architecture can dramatically reduce the data rate by reducing the digital processing at the BBU and/or the amount of baseband sampling data transmitted over the physical transport network. In the C-RAN re-architecture, part of the baseband processing can be moved to the RRU to reduce the amount of data transmitted over the physical transport network.

As previously discussed in a downlink (DL) channel processing example shown in FIG. 2A, the CP module including the CP adder 526 can be located in the RRU 530. The RRU can be configured to communicate with the BBU 510 via a physical communication link using a general interface between the RRU and BBU, such as the CPRI. The RRU can be configured to communicate with a wireless mobile device via an air interface using a wireless standard, such as 3GPP LTE or WiMAX. The BBU can be configured for MAC layer processing, transport layer processing, and/or logical layer processing. The general interface (e.g., CPRI) can provide an interface between the CP adder in the CP module in the RRU and an inverse fast Fourier transform (IFFT) modulator 524 in a modulating module in the BBU.

As previously discussed in an uplink (UL) channel processing example shown in FIG. 2B, the CP module including a CP remover 576 can be located in the RRU 530. The general interface (e.g., CPRI) can provide an interface between the CP remover in the CP module in the RRU and a fast Fourier transform (FFT) demodulator 574 in the modulating module in the BBU. Moving the CP module, which includes the add CP operation and the remove CP operation, from the RRU to the BBU (FIGS. 2A and 2B) can reduce a fiber link rate for the CPRI rate) by approximately 7% over the configurations of FIGS. 1A and 1B, with minimal performance complexity at the RRU. A random access channel (RACH) processing module may be used for uplink channel processing when the CP remover is located within the RRU. A physical random access channel (PRACH) or a random access channel (RACH) can be used for initial access by the UE to the RAN and when the UE losses its uplink synchronization.

Figure 4A:
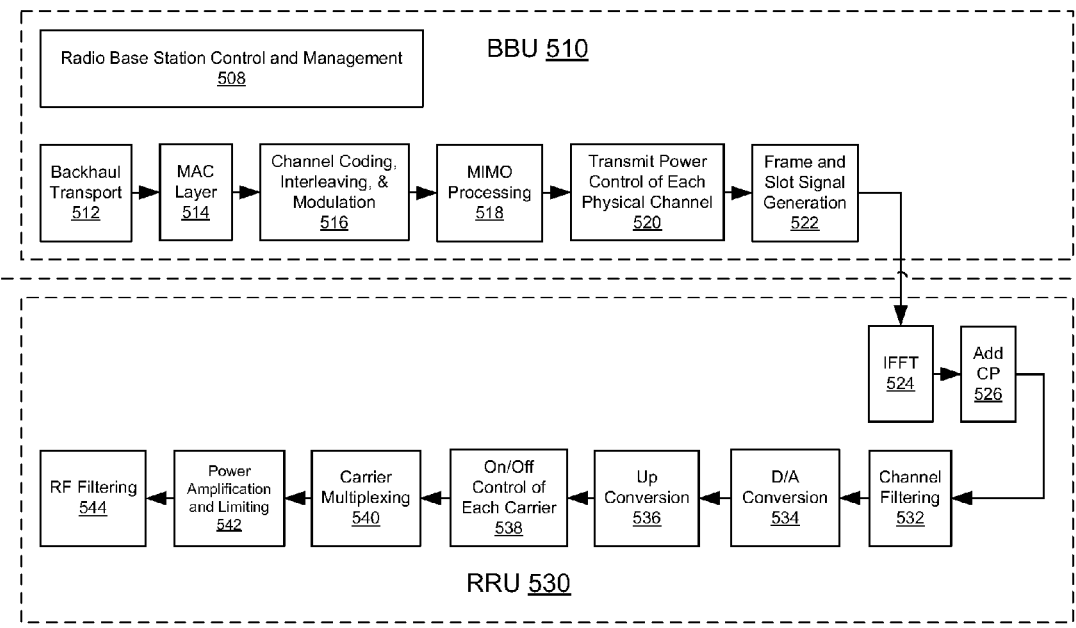
FIG. 4A illustrates a block diagram of a base band unit (BBU) and a remote radio unit (RRU) of a centralized radio access network (C-RAN) with an inverse fast Fourier transform (IFFT) module in the RRU for a downlink (DL) transmission in accordance with as example.
Figure 4B:
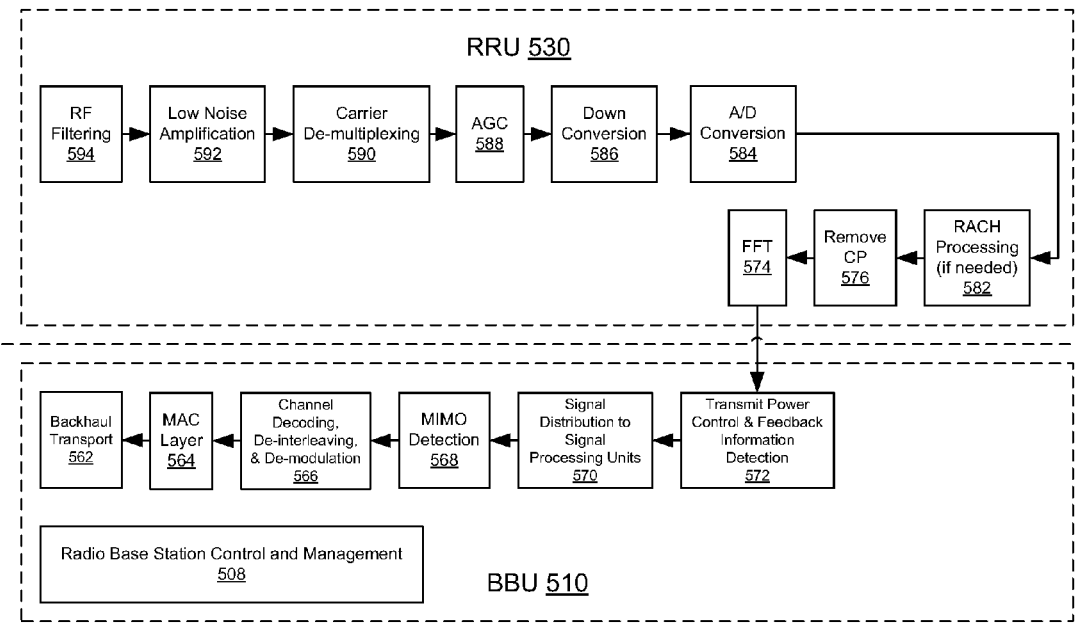
FIG. 4B illustrates a block diagram of a base band unit (BBU) and a remote radio unit (RRU) of a centralized radio access network (C-RAN) with a fast Fourier transform (FFT) module in the RRU for an uplink (UL) transmission in accordance with an example.

In another example, a modulating module can be located in the RRU 530 along with the CF module. The modulating module can include an inverse fast Fourier transform (IFFT) modulator for DL channel processing, or a fast Fourier transform (FFT) demodulator for UL channel processing. In the DL channel processing, IFFT 524 and add CP 526 can be moved to and be performed in the RRU, as shown in FIG. 4A. In the UL channel processing, the FFT 574, remove CP 576, and the digital signal processing for PRACH channel 582 can be moved to and performed in the RRU, as shown in FIG. 4B. Locating the modulating module and the CP module in the RRU can still maintain minimal signal processing at the RRU, so RRU power consumption and/or maintenance cost can be kept low. In addition, an approximately 45% reduction in the fiber link rate can be generated using the configurations illustrated in FIGS. 4A and 4B over the configurations illustrated in FIGS. 1A and 1B.

Figure 5:
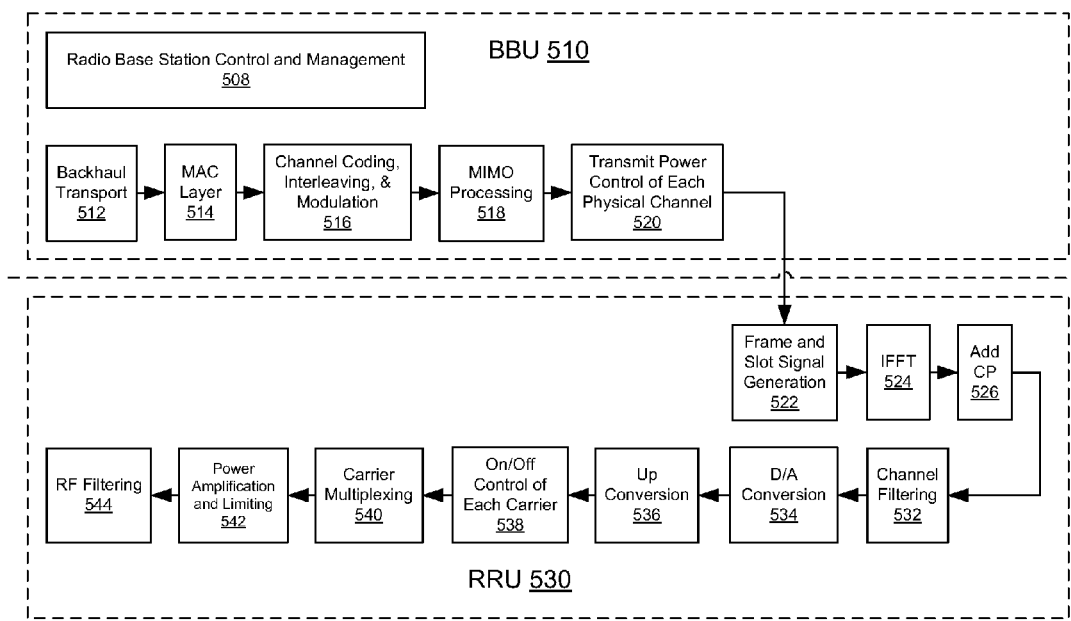
FIG. 5 illustrates a block diagram of a base band unit (BBU) and a remote radio unit (RRU) of a centralized radio access network (C-RAN) with a frame and slot signal generation module in the RRU for a downlink (DL) transmission in accordance with an example.

In another example illustrated in FIG. 5 for, a DL frame and signal slot generation 522 operation is moved from the BBU 510 to the RRU 530, and thus a frame and signal slot generation module can be located in the RRU. The fiber link rate can be reduced by approximately 53% in a DL transmission using the configuration illustrated in FIG. 5 over the configuration illustrated in FIG. 1A. For an UL transmission, the configuration illustrated in FIG. 4B can be used.

Figure 6A:
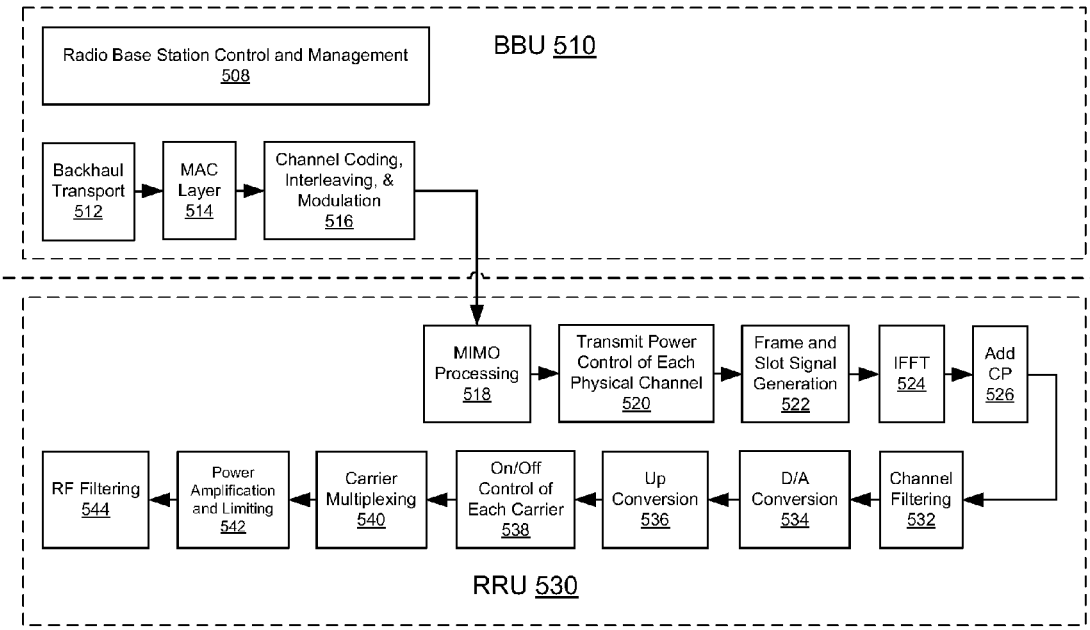
FIG. 6A illustrates a block diagram of a base band unit (BBU) and a remote radio unit (RRU) of a centralized radio access network (C-RAN) with a multiple-input multiple-output (MIMO) processing module in the RRU for a downlink (DL) transmission in accordance with an example.
Figure 6B:
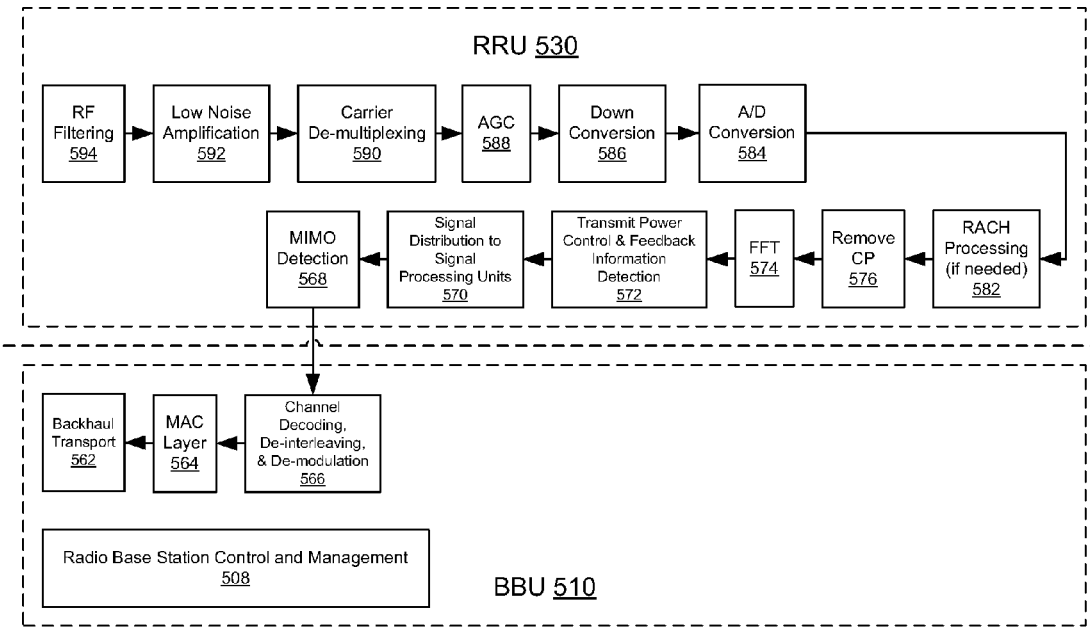
FIG. 6B illustrates a block diagram of a base band unit (BBU) and a remote radio unit (RRU) of a centralized radio access network (C-RAN) with a multiple-input multiple-output (MIMO) detection module in the RRU for an uplink (UL) transmission in accordance with an example.

In another example illustrated in FIGS. 6A and 6B, a MIMO processing 518 operation for a DL transmission and a MIMO detection 568 operation for a UL transmission can be moved from the BBU 510 to the RRU 530. The RRU 530 can include a frame and slot signal generation 522 module for DL channel processing, a signal distribution and signal processing unit 570 module for UL channel processing, a transmit power control module, and a multiple-input multiple-output (MIMO) module. The transmit power control module can provide power control for each physical channel 520 for downlink channel processing or transmit power control and/or feedback information detection 572 for uplink channel processing. The MIMO module can provide MIMO processing for DL channel processing or MIMO detection for UL channel processing.

The configurations illustrated in FIGS. 6A and 6B can reduce the fiber link rate when the number of antennas is more than the number of data streams. For example, when the RRU has four transmit/receive antennas, two DL transmission streams, and one UL transmission stream, the DL transmission can have an approximately 50% reduction in the fiber link rate and the UL transmission can have an approximately 75% reduction in the fiber link rate relative to the configurations illustrated in FIGS. 1A and 1B. With the configuration illustrated in FIGS. 6A and 6B, some cooperative MIMO schemes, such as UL joint processing, can be limited.

Figure 7A:
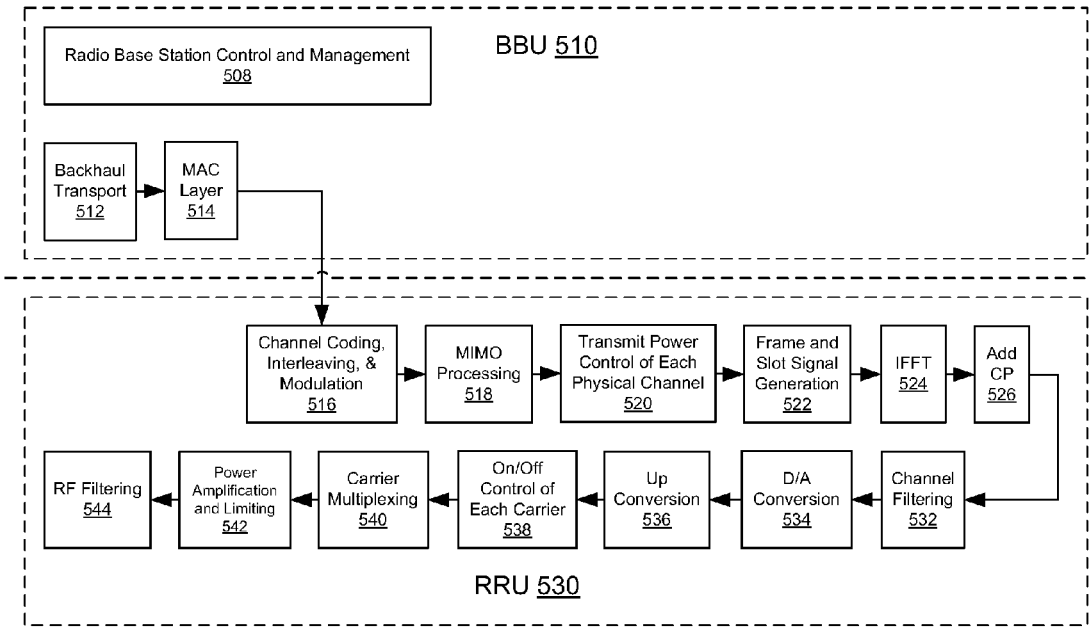
FIG. 7A illustrates a block diagram of a base band unit (BBU) and a remote radio unit (RRU) of a centralized radio access network (C-RAN) with channel coding, interleaving, and modulation modules in the RRU for a downlink (DL) transmission in accordance with an example.
Figure 7B:
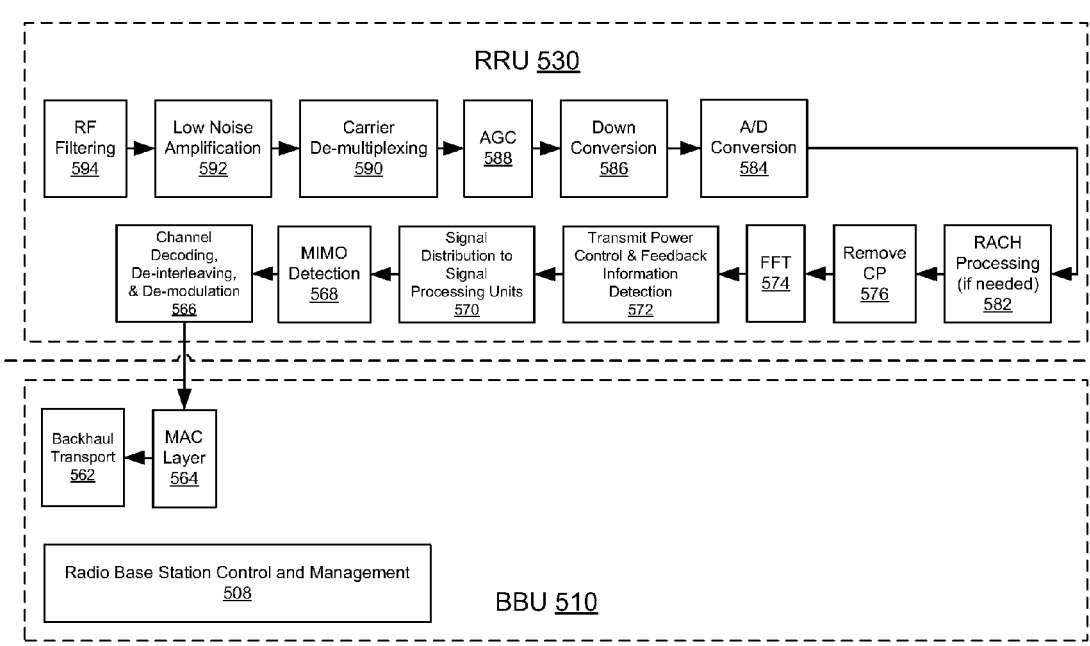
FIG. 7B illustrates a block diagram of a base band unit (BBU) and a remote radio unit (RRU) of a centralized radio access network (C-RAN) with decoding, de-interleaving, and de-modulation modules in the RRU for an uplink (UL) transmission in accordance with an example.

In another example shown in FIGS. 7A and 7B, a channel coding, interleaving, and modulation 516 operation for a DL transmission and a channel decoding, de-interleaving, and de-modulation 566 operation for a UL transmission can be moved from the BBU 510 to the RRU 530. A channel coding module, a channel interleaving module, and a channel modulation module can be included in the RRU. The channel coding module can include a channel coder for DL channel processing or a channel decoder for UL channel processing. The channel interleaving module can include a channel interleaver for DL channel processing or a channel de-interleaver for UL channel processing. The channel modulation module can include a channel modulator for DL channel processing or a channel de-modulator for UL channel processing. The configuration illustrated in FIGS. 7A and 7B can partition the processing based on MAC/PHY processing, where the RRU performs PHY layer processing and the BBU performs MAC layer processing. The configuration illustrated in FIGS. 7A and 7B can reduce the fiber link rate by more than 90% relative to the configurations illustrated in FIGS. 1A and 1B. Moving most of the PHY layer processing to the RRU can increase the power consumption and complexity of the RRU.

The configurations illustrated in FIGS. 2A, 2B, and 4A-7B provide re-partitions of the digital signal processing between BBU and RRU, which can reduce the data rate on the fiber transmission, and balance the processing that is performed at the BBU and the RRU. The C-RAN re-architecture can reduce signaling between the RRU and the BBU and enable BBU visualization using cloud based servers.

As illustrated in FIGS. 1A-2B and 4A-7B, the RRU can also include a channel filtering 532 module for DL channel processing, a digital-analog conversion module, a frequency conversion module, a gain, control module, a carrier multiplexing module, an amplification module, and a filtering module. The digital-analog conversion module can include a digital-to-analog converter (DAC) 534 for downlink channel processing or an analog-to-digital converter (ADC) 584 for uplink channel processing. The conversion module can include an up converter 536 for downlink channel processing or a down converter 586 for uplink channel processing. The gain control module can include an on/off controller for each carrier 538 for downlink channel processing or an automatic gain controller (AGC) 588 for uplink channel processing. The carrier multiplexing 540 module can include a carrier multiplexer for downlink channel processing or a carrier de-multiplexer 590 for uplink channel processing. The amplification module can include a power amplifier and limiter 542 for downlink channel processing or a low noise amplifier 592 for uplink channel processing. The filtering module can include a radio frequency filter 544 or 594.

Figure 8:
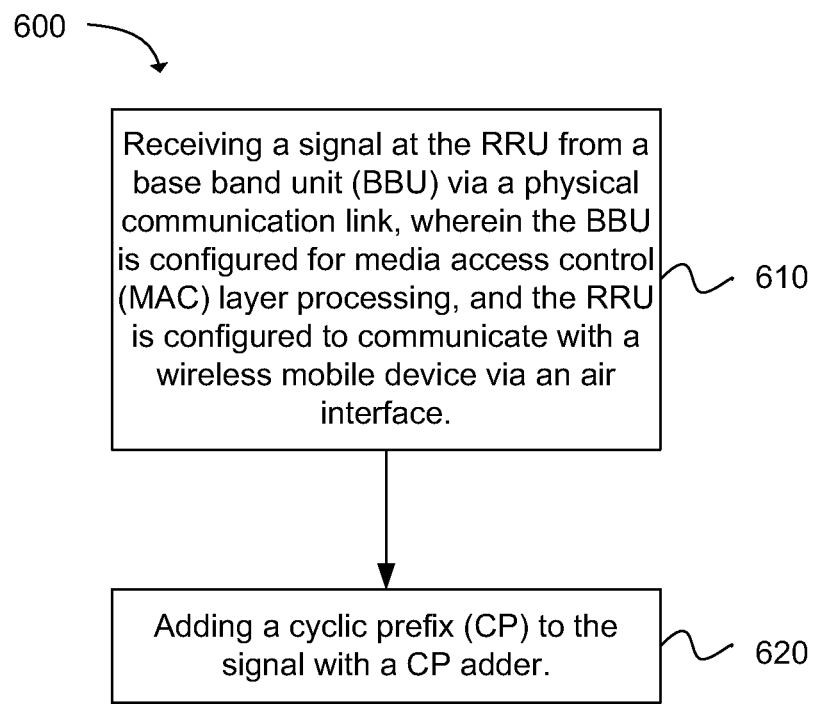
FIG. 8 depicts a flow chart of a method for downlink channel processing on a remote radio unit (RRU) in a radio access network (RAN) in accordance with as example.

Another example provides a method 600 for downlink channel processing on a remote radio unit (RRU) in a radio access network (RAN), as shown in the flow chart in FIG. 8. The method includes the operation of receiving a signal at the RRU from a base band unit (BBU) via a physical communication link, wherein the BBU is configured for media access control (MAC) layer processing, and the RRU is configured to communicate with a wireless mobile device via an air interface, as in block 610. The operation of adding a cyclic prefix (CP) to the signal with a CP adder follows, as in block 620.

The method 600 can further include the operation of inverse Fast Fourier transform (IFFT) processing an orthogonal frequency-division multiplexing (OFDM) symbols into a modulated signal using an inverse fast Fourier transform (IFFT) modulator, prior to adding the CP and after receiving the signal at the RRU. Another operation of the method can include generating a frame and slot signal using a frame and slot signal generator, prior to IFFT processing and after receiving the signal at the RRU. The operations of multiple-input multiple-output (MIMO) processing for separating a channel data stream into a plurality of MIMO data streams for multiple antenna ports using a MIMO processor, and controlling a transmit power of each physical channel using a transmit power controller can also be included, prior to generating the frame and slot signal and after receiving the signal at the RRU. Another operation of the method can include encoding binary input data for a channel using a channel encoder, interleaving coded data using a channel interleaver, and modulating interleaved data into a channel data stream using a channel modulator, prior to MIMO processing and after receiving the signal at the RRU.

Figure 9:
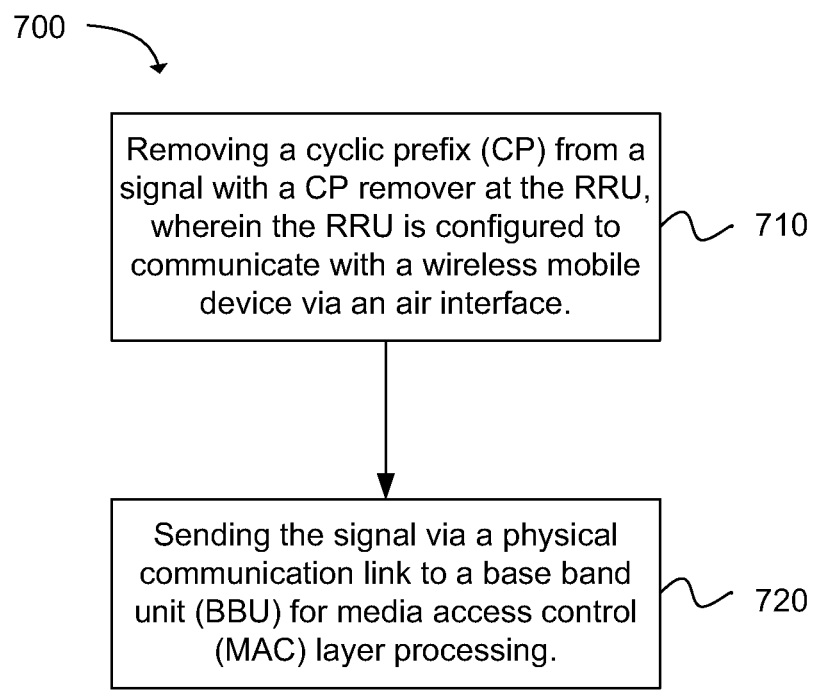
FIG. 9 depicts a flow chart of a method for uplink channel processing on remote radio unit (RRU) in a radio access network (RAN) in accordance with an example.

Another example provides a method 700 for uplink channel processing on remote radio unit (RRU) in a radio access network (RAN), as shown in the flow chart in FIG. 9. The method includes the operation of removing a cyclic prefix (CP) from a signal with a CP remover at the RRU, wherein the RRU is configured to communicate with a wireless mobile device via an air interface, as in block 710. The operation of sending the signal via a physical communication link to a base band unit (BBU) for media access control (MAC) layer processing follows, as in block 720.

The method 700 can further include the operation of random access channel (RACH) processing for initial access of the wireless mobile device or uplink synchronization using a RACH processor, prior to removing the CR. The operation of fast Fourier transform (FFT) processing a modulated signal at the RRU into an orthogonal frequency-division multiplexing (OFDM) symbol using a fast Fourier transform (FFT) demodulator can also be included, after removing the CP and before sending the signal to the BBU. Another operation of the method can include detecting feedback information from the OFDM symbols or controlling the transmit power of a received OFDM signal at the RRU using a transmit power controller or a feedback information detector, distributing the OFDM signal to signal processing units and processing the OFDM signal at the RRU using a signal distributor and a signal processing unit, and detecting multiple-input multiple-output (MIMO) data streams and combining the plurality of MIMO data streams into a data stream at the RRU using a MIMO detector, after FFT processing and before sending the signal to the BBU. The operations of de-modulating the data stream into interleaved data at the RRU using a channel de-modulator, de-interleaving interleaved data into coded data at the RRU using a channel de-interleaver, and decoding coded data into binary output data at the RRU for the channel using a channel decoder can also be included, after detecting MIMO data streams and before sending the signal to the BBU.

Figure 10:
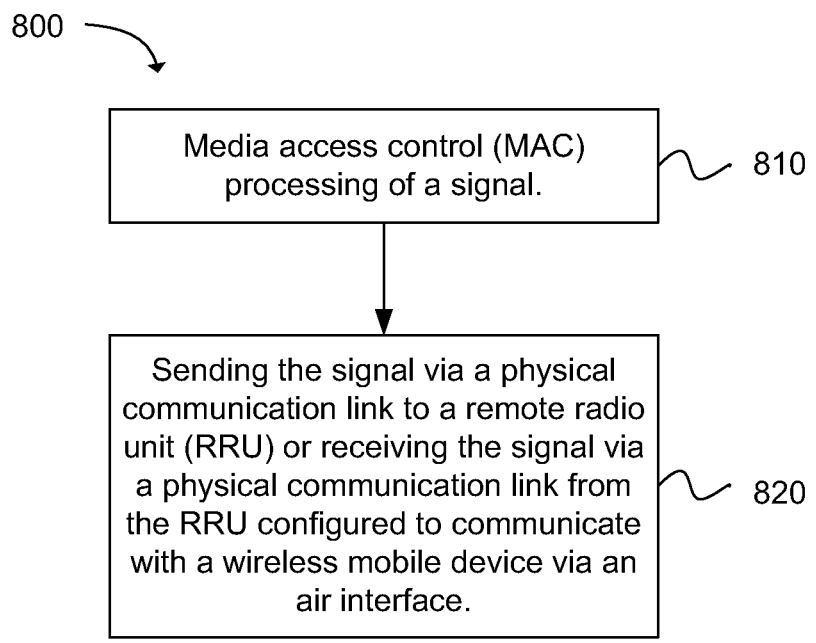
FIG. 10 depicts a flow chart of a method for channel processing on base band unit (BBU) in a radio access network (RAN) in accordance with an example.

Another example provides a method 800 for channel processing on base band unit (BBU) in a radio access network (RAN), as shown in the flow chart in FIG. 10. The method includes the operation of media access control (MAC) processing of a signal, as in block 810. The operation of sending the signal via a physical communication link to a remote radio unit (RRU) or receiving the signal via a physical communication link from the RRU configured to communicate with a wireless mobile device via an air interface follows, as in block 820.

The method 800 can further include for downlink channel processing, one of the following operations immediately prior to sending the signal to the RRU via the physical communication link: inverse fast Fourier transform (IFFT) processing of the signal using an inverse fast Fourier transform (IFFT) modulator, generating a frame and slot signal using a frame and slot signal generator, controlling a transmit power of each physical channel using a transmit power controller, or modulating signal using a channel modulator. For the method 800, the phrase "operations immediately prior" and "operations immediately after" refer to major physical layer operations, as illustrated in FIGS. 1A and 1B. Additional minor physical layer operations can still occur between the major physical layer operation and the sending the signal to the RRU in downlink channel processing or receiving the signal from the RRU in uplink channel processing, as long as the next major physical layer operation occurs in the RRU for downlink channel processing or the previous major physical layer operation occurred in the RRU for uplink channel processing.

The method 800 can further include for uplink channel processing, one of the following operations immediately after receiving the signal from the RRU via the physical communication link: last Fourier transform (FFT) processing of the signal using a fast Fourier transform (FFT) demodulator, detecting feedback information from the signal or controlling the transmit power of a received signal using a transmit power controller or feedback information detector, or de-modulating the signal using a channel de-modulator.

Figure 11:
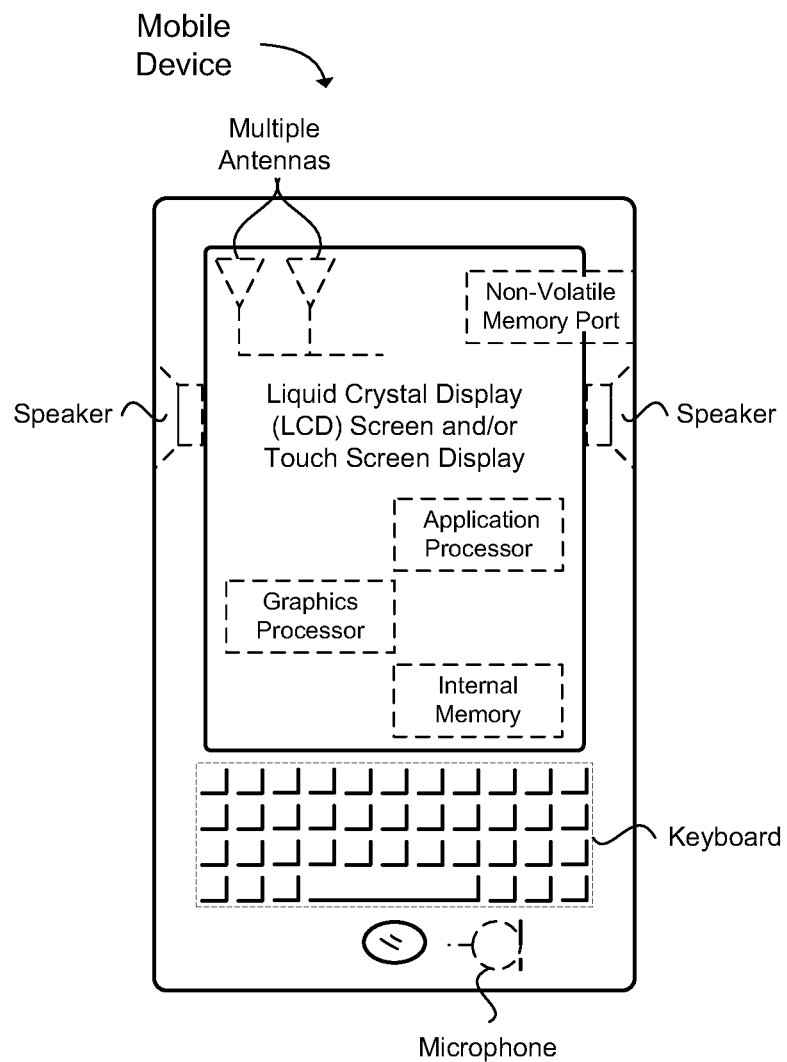
FIG. 11 illustrates a diagram of a mobile device in accordance with an example.

In another example, the BBU and the RRU can be in wireless communication with a mobile device. FIG. 11 provides an example illustration of a mobile device, such as a user equipment (UE), a mobile station (MS), a mobile wireless device, a mobile communication device, a tablet, a handset, or other type of mobile wireless device. The mobile device can include one or more antennas configured to communicate with transmission station, such as a base station (BS), an evolved Node B (eNB), a RRU, or other type of wireless wide area network (WWAN) access point. The mobile device can be configured to communicate using at least one wireless communication standard including 3GPP LTE. WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 11 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Various techniques, or certain aspects or portions thereof may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program (s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc, to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A remote radio unit (RRU) in a radio base station system, the RRU comprising:
   a cyclic prefix (CP) module having a CP adder for downlink channel processing and a CP remover for uplink channel processing; and
   a random access channel (RACH) processor for uplink channel processing;
   wherein the RRU is configured to communicate with a base band unit (BBU) in the radio base station system via a physical communication link and communicate with a wireless mobile device via an air interface, and the BBU is configured for media access control (MAC) layer processing.

2. The RRU of claim 1, further comprising a modulating module, wherein the modulating module includes an inverse fast Fourier transform (IFFT) modulator for downlink channel processing, or includes a fast Fourier transform (FFT) demodulator for uplink channel processing.

3. The RRU of claim 2, further comprising:
a transmit power controller, wherein the transmit power controller provides power control for each physical channel for downlink channel processing, or provides feedback information detection for uplink channel processing; and
a multiple-input multiple-output (MIMO) processor, wherein the MIMO processor provides MIMO processing for downlink channel processing, or provides MIMO detection for uplink channel processing.

4. The RRU of claim 3, further comprising:
a channel coding module, wherein the channel coding module includes a channel coder for downlink channel processing, or includes a channel decoder for uplink channel processing;
a channel interleaving module, wherein the channel interleaving module includes a channel interleaver for downlink channel processing, or includes a channel deinterleaver for uplink channel processing; and
a channel modulation module, wherein the channel modulation module includes a channel modulator for downlink channel processing, or includes a channel demodulator for uplink channel processing.

5. The RRU of claim 1, wherein the radio base station system is a radio access network (RAN) selected from the group consisting of a centralized RAN, a cooperative RAN, and a cloud RAN.

6. A method for downlink channel processing on a remote radio unit (RRU) in a radio access network (RAN), comprising:
receiving a signal at the RRU from a base band unit (BBU) in the RAN via a physical communication link, wherein the BBU is configured for media access control (MAC) layer of the signal, and the RRU is configured to communicate with a wireless mobile device via an air interface; and
generating a frame and slot signal using a frame and slot signal generator and adding a cyclic prefix (CP) to the signal with a CP adder at the RRU.

7. A computer program product, comprising a non-transitory computer readable storage medium having a computer readable program code embodied therein, the computer readable program code adapted to be executed to implement the method of claim 6.

8. The computer program product of claim 7, further comprising prior to adding the CP and after receiving the signal at the RRU:
inverse fast Fourier transform (IFFT) processing an orthogonal frequency-division multiplexing (OFDM) symbol into a modulated signal using an inverse fast Fourier transform (IFFT) modulator.

9. The computer program product of claim 8, further comprising prior to IFFT processing and after receiving the signal at the RRU:
generating a frame and slot signal using a frame and slot signal generator.

10. The computer program product of claim 9, further comprising prior to generating the frame and slot signal and after receiving the signal at the RRU:
multiple-input multiple-output (MIMO) processing for separating a channel data stream into a plurality of MIMO data streams for multiple antenna ports using a MIMO processor; and
controlling a transmit power of each physical channel using a transmit power controller.

11. The computer program product of claim 10, further comprising prior to MIMO processing and after receiving the signal at the RRU:
encoding binary input data for a channel using a channel encoder;
interleaving coded data using a channel interleaver; and
modulating interleaved data into a channel data stream using a channel modulator.

12. A method for uplink channel processing on remote radio unit (RRU) in a radio access network (RAN), comprising:
random access channel processing of a received signal and removing a cyclic prefix (CP) from the processed signal with a CP remover at the RRU, wherein the RRU is configured to communicate with a wireless mobile device via an air interface;
sending the signal via a physical communication link to a base band unit (BBU) in the RAN for media access control (MAC) layer processing.

13. A computer program product, comprising a non-transitory computer readable storage medium having a computer readable program code embodied therein, the computer readable program code adapted to be executed to implement the method of claim 12.

14. The computer program product of claim 13, further comprising prior to removing the CP:
random access channel (RACH) processing for initial access of the wireless mobile device or uplink synchronization using a RACH processor.

15. The computer program product of claim 13, further comprising after removing the CP and before sending the signal to the BBU:
fast Fourier transform (FFT) processing a modulated signal at the RRU into an orthogonal frequency-division multiplexing (OFDM) symbol using a fast Fourier transform (FFT) demodulator.

16. The computer program product of claim 15, further comprising after FFT processing and before sending the signal to the BBU:
detecting feedback information from the OFDM symbols or controlling the transmit power of a received OFDM signal at the RRU using a transmit power controller or feedback information detector;
distributing the OFDM signal to signal processing units and processing the OFDM signal at the RRU using a signal distributor and a signal processing unit; and
detecting multiple-input multiple-output (MIMO) data streams and combining the plurality of MIMO data streams into a data stream at the RRU using a MIMO detector.

17. The computer program product of claim 16, further comprising after detecting MIMO data streams and before sending the signal to the BBU:
de-modulating the data stream into interleaved data at the RRU using a channel de-modulator;
de-interleaving interleaved data into coded data at the RRU using a channel deinterleaver; and
decoding coded data into binary output data at the RRU for the channel using a channel decoder.

18. A method for channel processing on base band unit (BBU) in a radio access network (RAN), comprising:

media access control (MAC) processing of a signal; and sending the signal via a physical communication link from the BBU to a remote radio unit (RRU) in the RAN, wherein the RRU is configured to add a cyclic prefix (CP) to the signal using a CP adder; and receiving the signal via a physical communication link at the BBU from the RRU, wherein the RRU is configured to random access channel processing of the received signal and remove a cyclic prefix (CP) from the processed signal with a CP remover before sending the signal to the BBU in the RAN.

19. A computer program product, comprising a non-transitory computer readable storage medium having a computer readable program code embodied therein, the computer readable program code adapted to be executed to implement the method of claim 18.

20. The computer program product of claim 19, further comprising for downlink channel processing, immediately prior to sending the signal to the RRU via the physical communication link, the physical layer operation selected from the group consisting of:

inverse fast Fourier transform (IFFT) processing of the signal using an inverse fast Fourier transform (IFFT) modulator;

generating a frame and slot signal using a frame and slot signal generator;

controlling a transmit power of each physical channel using a transmit power controller; and modulating signal using a channel modulator.

21. The computer program product of claim 19, further comprising for uplink channel processing, immediately after receiving the signal from the RRU via the physical communication link, the physical layer operation selected from the group consisting of:

fast Fourier transform (FFT) processing of the signal using a fast Fourier transform (FFT) demodulator;

detecting feedback information from the signal or controlling the transmit power of a received signal using a transmit power controller or feedback information detector; and de-modulating the signal using a channel de-modulator.

* * * * *